March 19, 1957 I. H. MAGES ET AL 2,785,474
PRECISION SPHERICAL SURFACE GAUGE
Filed Oct. 21, 1953
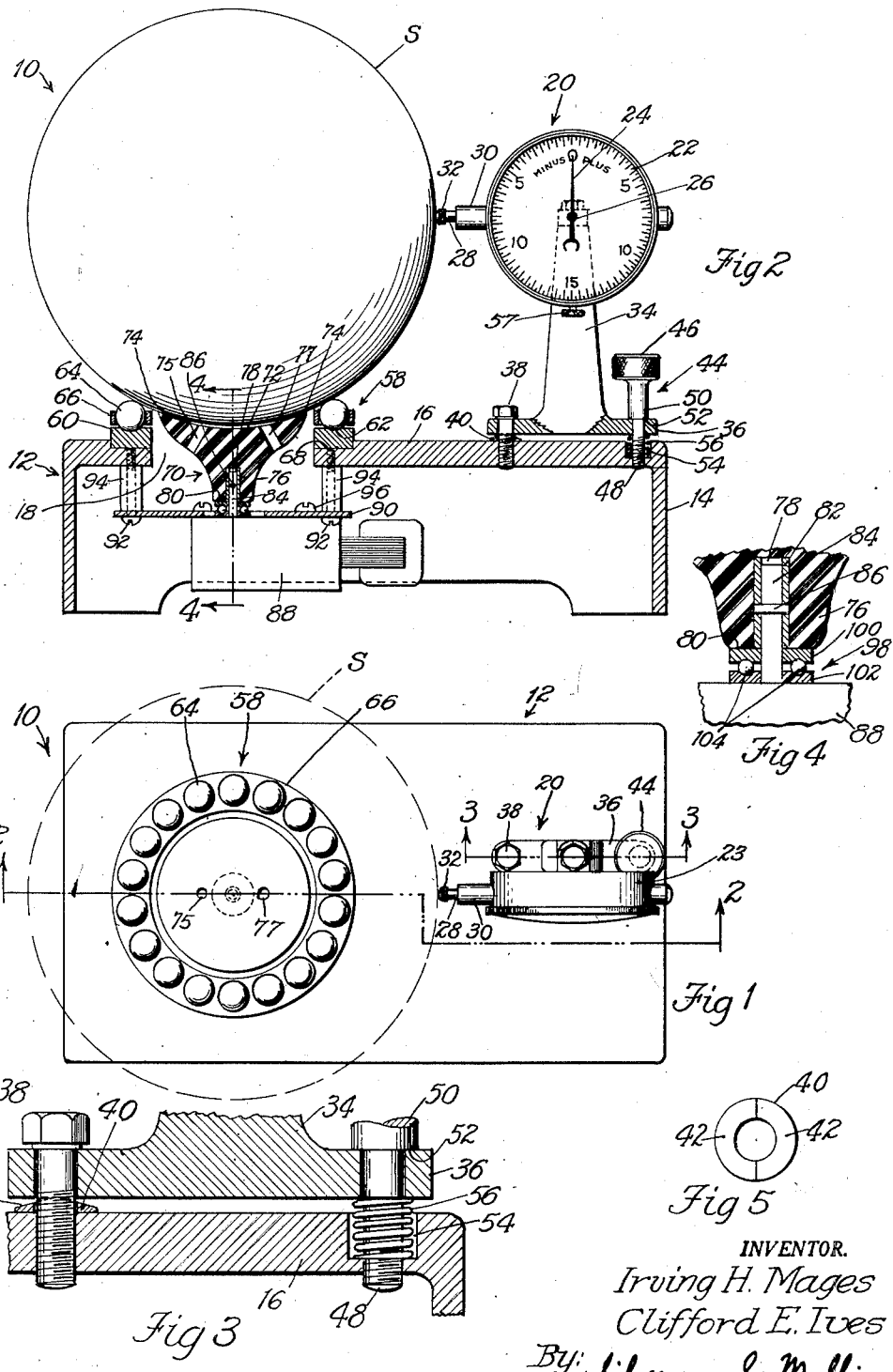
INVENTOR.
Irving H. Mages
Clifford E. Ives
BY Silverman & Mullin United States Patent Office 2,785,474
Patented Mar. 19, 1957

2,785,474

PRECISION SPHERICAL SURFACE GAUGE

Irving H. Mages and Clifford E. Ives, Chicago, Ill., assignors to Mages Sporting Goods Co., Chicago, Ill., a corporation of Illinois Application October 21, 1953, Serial No. 387,364

12 Claims. (Cl. 33—178)

This invention relates to testing instruments and gauges and more particularly to an instrument for gauging or testing the uniformity of the circumferences of a spherical object with great precision. Specifically, the invention affords a means for visually observing the measurement of the uniformity of any selected circumference of a sphere during the actual gauging thereof.

It is well known that precision methods are employed in the manufacture of spherical objects such as various types of balls used in sporting games including bowling, billiards, and the like. The maximum and minimum tolerances of the uniformity of curvature is usually plus or minus a few thousandths of an inch. However, after service or usage over a period of time, the balls often become deformed and marked to an extent which may appreciably affect the accuracy of the rotation of the ball. Naturally, the contestant's score may be affected thereby. Moreover, since the distortion is ordinarily non-uniform, the user cannot always manually compensate for the error resulting from the distortion of the ball.

Heretofore, to our knowledge, no practical, mechanical method or precision instrument has been available for testing such spherical objects to determine the uniformity of curvature of the ball by direct measurement and reading. It is therefore an important object of this invention to provide a precision instrument with which a spherical object, such as a ball, may be tested to determine the degree of distortion, if any, of the spherical surface of the object. Moreover, the instrument permits visual determination of the above-mentioned characteristic readily and without necessitating any prior preparation or extensive testing procedure.

Another important object is to afford a spherical surface testing machine in which the uniformity of curvature and degree of deformation of spherical objects may be visually observed during the rotation of the sphere in the machine.

A further object is to provide a testing device in which the surface of the sphere is tested simultaneously about at least two circumferential paths spaced apart substantially on the surface of the sphere.

Still another object is to afford a novel ball race member for supporting the sphere in the machine during the rotation thereof, and in such a manner as to require minimum torque to accomplish the same.

Still a further object is to provide a sphere tester with means for readily and simply adjusting or setting the micrometer indicator sensing arm to operational position with respect to the various spherical objects being tested.

Yet another object is to afford means for supporting and rotating a sphere for gauging purposes without said means negatively affecting the gauging readings. An object relating thereto is to utilize means for supporting the sphere other than the rotating means itself.

Yet a further object is to provide a sphere testing machine so designed that even an inexpensive small fractional-horsepower motor will exert sufficient torque to rotate the sphere.

Another object is to afford means for transmitting the rotative forces from the actuating motor to the rotating device without adversely affecting the precision of the gauging measurements.

And yet a further object is to provide a simple, inexpensive extremely accurate spherical surface measuring device having relatively few component parts and arranged in sturdy, compact relationship.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a top plan view of a precision spherical surface gauge embodying our invention with a ball shown in dotted outline in operational position;

Fig. 2 is a sectional view taken on the plane of broken line 2—2 in Fig. 1 of the drawings;

Fig. 3 is a full scale fragmentary sectional view taken on the plane of line 3—3 in Fig. 1 of the drawings and viewed in the direction indicated;

Fig. 4 is a fragmentary sectional view taken on the plane of line 4—4 in Fig. 2 of the drawings, viewed in the direction indicated and illustrating certain details of construction; and Fig. 5 is a top plan view of one of the component elements.

Referring to Figs. 1 and 2 of the drawings, reference numeral 10 indicates generally the testing machine including a hollow base 12 which may be of generally rectangular shape with vertical sidewalls 14 supporting a horizontal tabletop 16. This base may be made of any suitable material such as metal. The top 16 is formed with an opening 18 positioned somewhere between the center and one end of the tabletop. The purpose of this opening will be revealed as the description proceeds.

Mounted near the opposite end of the tabletop is a micrometer indicator referred to generally by reference numeral 20. The micrometer indicator in turn comprises a calibrated scale 22 enclosed in a suitable housing 23 and having an indicator hand or pointer 24 pivotally mounted as at 26. The pointer is angularly or rotatably movable over the face of the scale.

The indicator pointer 24 may be rotated in response to the movement of an indicator sensing pin 28, movable horizontally through a protective sleeve 30. The pin 28 is provided with a sensing head 32 which directly contacts the sphere S, the surface of which is being tested.

The micrometer indicator may be mounted on a vertically disposed standard 34 integrally formed with a horizontal base 36. A partially screw-threaded bolt 38 extending through the standard base 36 and threaded into the base tabletop 16 is positioned on one side of the standard 34 to affix the micrometer indicator standard to the base 16. Mounted on the bolt 38 interposed between the standard base 36 and the top of the base top 16 may be a novel washer 40. This washer 40 may be formed with an inverted V-shaped top surface 42, the function of which will become apparent as the description proceeds.

Extending through the base 36 on the side of the standard 34 opposite to that in which the bolt 38 is positioned, may be a simple novel device for adjusting or setting the micrometer indicator with respect to the sphere S in preparation for the testing or gauging of the same. This device comprises an adjusting screw 44 provided with a knurled head 46 and terminating in a screw-threaded portion 48 of lesser diameter than the top portion 50 of the adjusting screw, whereby a shoulder is afforded as at 52.

The tabletop 16 is formed with a recess 54 in the top thereof, said recess being of substantially greater diameter than that of the screw-threaded portion 48 of the screw. This screw-threaded portion 48 is disposed through the standard base 36, extends through the recess 54 and is finally threaded into the portion of the tabletop 16 below the bottom of the recess 54. It will be noted that when so positioned the shoulder 52 abuts the top of the standard base 36 as shown in Figs. 2 and 3 of the drawings.

Coiled about the reduced diameter portion 48 of the screw 44 is a spring 56 positioned within the recess 54 so that it may expand between the bottom of the standard base 36 and the bottom of the recess 54.

The operation of the adjusting screw for the purpose of setting the micrometer indicator for testing the sphere S should be readily apparent from the above described structure. Briefly, the adjusting screw 46 is rotated in one direction or the other until the sensing head 32 of the sensing pin 28 bears against the surface of the sphere S in such relationship that the pointer 24 is positioned at the zero point of the calibrated scale as shown in Fig. 2 of the drawings.

When the pointer is in the "plus" range (to the right of the zero point), the indication is that the sensing arm 28 has been moved to the right (as viewed in Fig. 2) by the adjacent surface of the sphere. The adjustment indicated thereby is to turn the adjustment screw 44 in a direction to tighten the same. This lowers the screw so that the shoulder 52 bears downwardly towards the top of the standard base 36 and thereby moves the standard 34 and the entire micrometer indicator 20 away from the sphere. It shoud be apparent that the wedge-shaped or inverted V-shaped top surface 42 of the washer 40 cooperates with the adjusting screw 44 to tilt the micrometer standard 34 in accordance with the operation of the adjusting screw.

When the micrometer pointer 24 is in the "minus" range (to the left of the zero point) of the calibrated scale 22, it indicates that the sensing head 32 is excessively extended to the left (as viewed in Fig. 2). To return the pointer 24 to the zero point, the adjusting screw 44 is loosened whereby the expanding spring 54 bearing against the bottom of the standard base 36 tilts the standard in a direction towards the sphere until the pointer is returned to the zero mark. Dial or scale adjusting means such as a set screw 57 may be provided for the purpose of rotating the dial itself if necessary.

The description to this point has been concerned chiefly with the micrometer indicator, the adjusting or setting mechanism, and the base of the machine. The ingenious sphere rotating and supporting structure which will now be described is considered to be of prime importance to the invention.

It should be noted that in order to precisely gauge the surface of the sphere S without introducing errors attributable to other factors, the sphere must be supported and rotated in a manner which will eliminate or compensate for such sources of error. Hence it is important that the sphere be supported during its rotation on a small circle of the sphere, the diameter of which is greater than zero but less than the greatest diameter of the sphere. Moreover, the object must be rotated without the sphere itself being appreciably supported on the rotating member. The novel structure by means of which the above mentioned conditions are ingeniously met may be observed particularly in Figs. 1 and 2 of the drawings.

The supporting structure comprises a ball race indicated generally by reference numeral 58 and comprising a face ring 60 having a central annular groove 62 formed in the top surface thereof adapted to accommodate therein a plurality of precision-formed ball bearings 64. The ball bearings are rotatably positioned and retained in spaced relationship to each other by means of a retainer ring 66 positioned so that the top of the ball bearings 64 protrude above the top of the ring. Thus the sphere is supported solely by the balls. The entire race may be positioned within a counter-bore 68 formed in the marginal edge of the tabletop 16 encircling the opening 18 of the tabletop.

The rotating mechanism may comprise a cup-shaped member 70 affording a top concave surface 72, the degree of curvature of which should be greater than the curvature of the sphere so that contact between the surface of the sphere and the cup member 70 is limited to a relatively narrow area comprising a zone of the sphere surface as indicated at 74. Air passages such as 75 and 77 may be provided to prevent the formation of a partial vacuum between the sphere and the surface 72 of the cup 74. The rotating cup may be made of a friction material such as hard rubber.

The cup member 70 is provided with a lower stem portion 76 within which may be formed a central hole 78 extending inwardly from the bottom surface 80 of the stem. A bearing sleeve 82 may be fitted into this opening 78 to accommodate therein the top end of a motor shaft 84 in close-tolerance relationship. A pin such as 86 may be inserted through the bearing sleeve 82 and shaft 84 for more securely joining the drive shaft to the rotating cup 70.

The motor drive shaft 84 may be driven by a small fractional horsepower motor such as 88 which may be positioned within the base 12. The motor 88 may be suspended from the tabletop in any convenient manner. However, for the purpose of illustration, as shown in Fig. 2 of the drawings, a supporting plate 90 is suspended from the bottom of the tabletop 16 by means of screws such as 92 threaded into the tabletop 16 through the spacing sleeves 94. The motor may then be affixed by means of screws or bolts such as 96 threaded into the motor housing through the supporting plate 90.

A thrust bearing device such as 98 may be interposed between the top of the motor housing 88 and the bottom of the cup stem 76. This thrust bearing comprises a ball bearing assembly consisting of a pair of races such as 100 and 102 between which a plurality of ball bearings such as 104 may be positioned in suitable cooperating annular grooves formed in the adjacent surfaces of the races 100 and 102.

The operation of the testing machine is as follows. The sphere S is placed upon the supporting ball bearing race assembly as shown in Figs. 1 and 2 of the drawings so that the sphere is supported only by the ball bearings 64. However, a narrow zone of the sphere surface is contacted by an edge portion 74 of the concave arcuate surface 72 of the cup-shaped member 70. This contact is not a supporting contact but merely sufficient to transmit the rotative force of the driven cup member to the sphere S. The micrometer indicator is then adjusted by means of the adjusting screw 46 so that the sensing head 32 abuts the adjacent surface of the sphere S in such a manner that the pointer 24 is positioned at the zero point of the calibrated scale 22.

The motor 88 is then energized to cause the sphere to rotate. It will be noted that the sphere rotates upon a rotating surface itself since both the balls 64 and, as a matter of fact, the entire race 58 rotates at speeds progressively less than the speed of rotation of the sphere itself. This rotating support obviously offers the least frictional resistance to the rotation of the sphere enabling the utilization of a small inexpensive motor.

As the sphere is rotated, a circumferential path is traced on the surface of the sphere at the point adjacent the sensing head 32. The uniformity of this path is sensed by the sensing pin 28 causing the pin to reciprocate imperceptibly within the protective sleeve 30. The pointer 24 being pivotally connected by means of suitable gearing to the sensing pin 28 as at 26, is actuated by the movement of the pin; the horizontal movement of the pin being translated to an angular movement of the pointer. In this way the contour of the surface may be measured precisely as in thousandths of an inch and any nonuniformity thereof visually observed on the indicator scale 22 as traced by the pointer 24. The "valleys" of the surface will be indicated by rotation of the pointer over the "minus" range of the indicator dial and conversely the "hills" of the surface will be indicated by the movement of the pointer in the "plus" range.

It should be noted that by supporting the sphere in the manner described, the necessity for precisely aligning the mechanical center of the sphere with the axis of the rotative member 70 is obviated. The sphere, since it is not actually supported on a platform but rather on points diametrically equally spaced from and surrounding the axis of rotation, tends to accurately seek its own mechanical center. This not only eliminates any error which might result from internal discrepencies in the sphere itself, such as off-centering of the center of gravity of the sphere, but likewise prevents the introduction of any error from the rotative motor and mechanism.

From the foregoing description, it will be evident that we have provided an instrument for precisely gauging and testing the surface of a spherical object. We have further provided a supporting and rotating mechanism which positively eliminates or compensates for any errors which might otherwise be introduced if the sphere were supported and rotated in a manner other than that disclosed hereinabove. Although the spherical object selected for illustration comprises a bowling ball, it should be obvious that our testing machine may be effectiveley and as readily utilized for gauging and testing any spherical object or arcuate surface.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. In a spherical surface gauge of the character described, a micrometer indicator having a sensing arm, means for rotating a spherical object adjacent the end of said sensing arm and means for supporting said spherical object in self-centering relationship whereby a circumferential zone of the surface of said spherical object is gauged for uniformity of curvature and indicated by said indicator said rotating means comprising a driving member having a concave arcuate surface and means for rotating said driving member.

2. The spherical surface gauge of claim 1 in which said driving member rotating means comprises a small fractional-horsepower electric motor and a drive shaft.

3. In a spherical surface gauge of the character described, a micrometer indicator having a sensing arm, means for rotating a spherical object adjacent the end of said sensing arm and means for supporting said spherical object in self-centering relationship whereby a circumferential zone of the surface of said spherical object is gauged for uniformity of curvature and indicated by said indicator said rotating means comprising a ball race and a plurality of ball bearings positioned in spaced relationship one with the other in said race, said sphere supported on said ball bearings.

4. The surface gauge of claim 3 in which said ball race comprises a race ring positioned in spaced concentric relationship with said rotating means, said race ring having a central annular groove formed in the top surface thereof and a retainer ring encircling said balls and positioning the same in rotatable spaced relationship one with the other.

5. In a machine for testing the surface of a sphere, a base affording a horizontal tabletop, a standard mounted on said base, a micrometer indicator mounted on said standard, a portion of said tabletop formed with an opening therethrough, a driven rotating cup member mounted in said opening and protruding above the tabletop, said cup having a concave arcuate top surface adapted to lightly contact the surface of said sphere only at a narrow zone thereof, and ball-race means for rotatably supporting the sphere in self-centering gauging relationship adjacent said micrometer indicator.

6. The machine of claim 5 in which said tabletop is formed with a counter-bore encircling said opening and said ball-race means is positioned in said counter-bore.

7. The machine of claim 5 in which said standard is formed with a horizontal base, a threaded bolt affixing one end of said horizontal standard base to said tabletop, a washer having a wedge-shaped top surface mounted on said bolt between said tabletop and said horizontal standard base, an adjusting-screw extending through the other end of said base into said tabletop through a recess formed therein, said adjusting-screw formed with a shoulder positioned above said tabletop, and a spring coiled about said screw and positioned in said recess.

8. A precision sphere tester comprising in combination a base, a micrometer indicator adjustably mounted on said base, a sphere-rotating device positioned in friction-engaging relationship below the sphere and a ball-race sphere-supporting device adapted to support the sphere in proper gauging relationship to said micrometer indicator, said sphere-rotating device and said sphere-supporting device mounted on said base.

9. A precision sphere tester comprising in combination a hollow rectangular-shaped base defined by a horizontal table-top and integrally formed vertical side walls, said tabletop formed with an opening near one end thereof and a recess near the opposite end; a vertically-extending standard having a horizontal base positioned on said tabletop and adjustably secured thereto by means of a bolt threaded through said horizontal base and tabletop on one side of said standard, a washer having an inverted V-shaped top surface mounted on said bolt between said tabletop and the bottom of said horizontal base, an adjusting screw having an intermediate shoulder threaded through the other side of said horizontal base through said recess and tabletop, a spring coiled about said screw and free to expand between the bottom of the horizontal base and the bottom of the recess; a micrometer indicator mounted on the top of said standard, said indicator comprising a scale with a pointer angularly movable over the face thereof, a horizontally disposed protective sleeve and a sensing arm reciprocable in said sleeve to rotate said pointer; a cup-shaped sphere-rotating device mounted in said tabletop opening, said rotating device having a concave arcuate top surface, the degree of curvature of said surface being greater than that of the sphere, said device formed with air passages communicating between the top surface and side thereof, said cup-shaped device also formed with a bottom-stem portion having a central upwardly-extending aperture, a bearing sleeve positioned in said aperture, one end of a motor drive shaft secured within said bearing sleeve, an electric motor for rotating said shaft, said motor suspended from a supporting plate, said supporting plate suspended from said tabletop, a thrust-bearing mounted on said motor shaft below said rotating device; said tabletop having a counter-bore encircling the marginal edge of said opening and a rotatable ball-race sphere-supporting member positioned in said counterbore.

10. The sphere tester of claim 9 in which said sphere-supporting member comprises a race-ring having a continuous annular groove formed in the top surface thereof, a plurality of precision-formed ball-bearings positioned in said annular groove, a retaining ring encircling said ball-bearings and retaining the same in spaced relationship one with the other, each of said ball-bearings having a portion thereof protruding above said retaining ring.

11. In a precision sphere tester of the character described having a table-top base, a micrometer having a sensing arm and indicator mounted on a standard adjustably mounted on said base; a cup-shaped sphere-rotating device mounted in an opening formed in said base, said rotating device having a concave arcuate top surface, the degree of curvature of said surface being greater than that of the sphere, said device formed with air passages communicating between the top surface and side thereof, said cup-shaped device also formed with a bottom-stem portion having a central upwardly-extending aperture, a bearing sleeve positioned in said aperture, one end of a motor drive shaft secured within said bearing sleeve, an electric motor for rotating said shaft, said motor suspended from a supporting plate, said supporting plate suspended from said tabletop, a thrust-bearing mounted on said motor shaft below said rotating device; said tabletop having a counter-bore encircling the marginal edge of said opening and a rotatable ball-race sphere-supporting member positioned in said counter-bore.

12. The sphere tester of claim 11 in which said sphere-supporting member comprises a race-ring having a continuous annular groove formed in the top surface thereof, a plurality of precision-formed ball-bearings positioned in said annular groove, a retaining ring encircling said ball-bearings and retaining the same in spaced relationship one with the other, each of said ball-bearings having a portion thereof protruding above said retaining ring.

References Cited in the file of this patent
UNITED STATES PATENTS

| | | |
|---|---|---|
| 1,818,968 | Anderson | Aug. 18, 1931 |
| 2,030,237 | Brittain et al. | Feb. 11, 1936 |
| 2,052,153 | Willis | Aug. 25, 1936 |
| 2,278,800 | Rodanet | Apr. 7, 1942 |
| 2,336,695 | Maurer | Dec. 14, 1943 |
| 2,469,904 | Szuba | May 10, 1949 |
| 2,508,251 | Ingle | May 16, 1950 |
| 2,542,090 | Lorenz | Feb. 20, 1951 |
| 2,700,889 | Young | Feb. 1, 1955 |